(12) United States Patent
Kiten

(10) Patent No.: US 9,593,758 B2
(45) Date of Patent: Mar. 14, 2017

(54) GEAR DEVICE

(71) Applicant: Toyota Jidosha Kabushiki Kaisha, Toyota-shi, Aichi-ken (JP)

(72) Inventor: Takashi Kiten, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 45 days.

(21) Appl. No.: 14/717,325

(22) Filed: May 20, 2015

(65) Prior Publication Data
US 2015/0337942 A1 Nov. 26, 2015

(30) Foreign Application Priority Data

May 21, 2014 (JP) ................................. 2014-105458

(51) Int. Cl.
*F16H 55/16* (2006.01)
*F16H 55/08* (2006.01)

(52) U.S. Cl.
CPC ......... *F16H 55/0886* (2013.01); *F16H 55/08* (2013.01); *F16H 55/16* (2013.01); *F16H 2055/086* (2013.01); *Y10T 74/19972* (2015.01)

(58) Field of Classification Search
CPC .............................. F16H 55/0886; F16H 55/16
See application file for complete search history.

(56) References Cited

U.S. PATENT DOCUMENTS

| 2004/0154423 A1* | 8/2004 | Litvin | ...................... B21K 1/30 74/462 |
| 2007/0125148 A1* | 6/2007 | Dohmann | ................ B21K 1/30 72/352 |
| 2010/0307234 A1 | 12/2010 | Ono et al. | |
| 2013/0216321 A1* | 8/2013 | Heer | ...................... B23F 19/002 409/2 |
| 2015/0082930 A1* | 3/2015 | Okamoto | ............ F16H 55/0886 74/458 |

FOREIGN PATENT DOCUMENTS

| JP | 2008-275060 A | 11/2008 |
| JP | 2009-210329 A | 9/2009 |
| JP | 2010-159835 A | 7/2010 |

* cited by examiner

*Primary Examiner* — Terence Boes
(74) *Attorney, Agent, or Firm* — Dinsmore & Shohl LLP

(57) ABSTRACT

A gear of a gear device includes a plurality of teeth having tooth surfaces. The tooth surfaces are shaped such that contact length ratios of three or more of the teeth are outside a predetermined range centered on an average value of the contact length ratios of all of the teeth, where the contact length ratio is obtained by dividing a contact length of a tooth contact face by a diagonal length of a plane of action.

3 Claims, 6 Drawing Sheets

GEAR DEVICE

INCORPORATION BY REFERENCE

The disclosure of Japanese Patent Application No. 2014-105458 filed on May 21, 2014 including the specification, drawings and abstract is incorporated herein by reference in its entirety.

BACKGROUND OF THE INVENTION

1. Field of the Invention

The invention relates to a gear device that transmits power via gears.

2. Description of Related Art

A gear device transmits power through meshing engagement of gears. The gears rotate while constantly meshing or engaging with each other. Depending on the situation where the gear device is installed, there is an increasing demand for quietness. In the field of automobiles, for example, vibration noise generated in a vehicle as a whole has been reduced to some extent owing to various improvements. However, vibration noise caused by meshing engagement of gears is determined by the shape of the gears and the machining accuracy of the gears; therefore, the reduction of the noise has not progressed so much. Under the situation where surrounding vibration noise caused by other components is being reduced, the vibration noise caused by meshing engagement of the gears is becoming gradually noticeable.

Japanese Patent Application Publication No. 2008-275060 (JP 2008-275060 A) discloses a gear device for use in a railroad vehicle. In the gear device as described in JP 2008-275060 A, a tooth surface is subjected to 5 to 20 μm crowning in a direction of a contact line of the tooth surface, and gear dimensions are adjusted so that the contact ratio falls within the range of 2.4 to 2.8, while the tooth surface is modified so that the ratio of a contact length of a tooth contact face to a diagonal length of a plane of action falls within the range of 0.6 to 0.95.

SUMMARY OF THE INVENTION

The effect of tooth surface modification is closely related with the shape of the tooth contact face. Various attempts to set the shape of the tooth surface based on geometric theories have been made, and the machining accuracy of the tooth contact face has been improved due to technological advances of recent years. With the machining accuracy thus improved, the tooth surfaces of all of the teeth in one gear may be shaped uniformly with specified dimensions. Consequently, vibratory force at particular frequencies may be increased. If the tooth surfaces of all of the teeth are shaped uniformly, the vibratory force at a peak frequency may not be sufficiently reduced.

Namely, in the gear device as described above, if the contact length ratio of each tooth is made constant or uniform throughout one gear, the vibratory force at a particular frequency or frequencies may be increased, and vibration noise may be increased. The contact length ratio is a value obtained by dividing the contact length of a tooth contact face by the diagonal length of a plane of action. The invention provides a gear device that can suppress generation of vibration noise caused by the uniformity of the contact length ratio of each tooth.

A gear device according to one aspect of the invention includes a gear including a plurality of teeth having tooth surfaces, and the tooth surfaces are shaped such that contact length ratios of three or more of the teeth are outside a predetermined range centered on an average value of the contact length ratios of all of the teeth. The contact length ratio is obtained by dividing a contact length of a tooth contact face by a diagonal length of a plane of action.

In the gear device, the predetermined range may be between a value obtained by adding 5% to the average value and a value obtained by subtracting 5% from the average value.

In the gear device, the number of teeth of the gear may be 41, and where a tooth located at a given position of the gear may be a 1st tooth, the teeth whose tooth surfaces are shaped such that the contact length ratio is outside the predetermined range centered on the average value may include the 1st tooth, a 5th tooth, a 6th tooth, a 14th tooth, a 27th tooth, a 28th tooth, and a 29th tooth With the above arrangement that the contact length ratios of three or more teeth are outside the predetermined range centered on the average value of the contact length ratios of all teeth, the meshing frequency varies while the gear makes one rotation, and a peak of the vibratory force, which appears at a particular frequency, can be reduced, resulting in suppression of generation of vibration noise.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
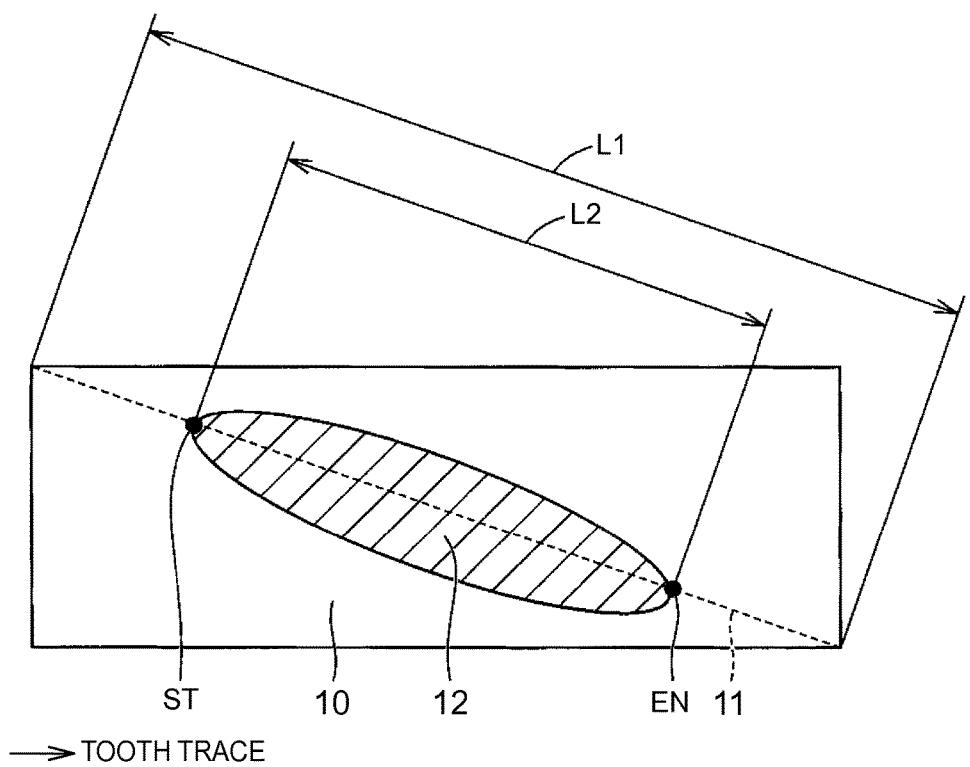
FIG. 1 is a view useful for explaining the contact length ratio.
Figure 7:
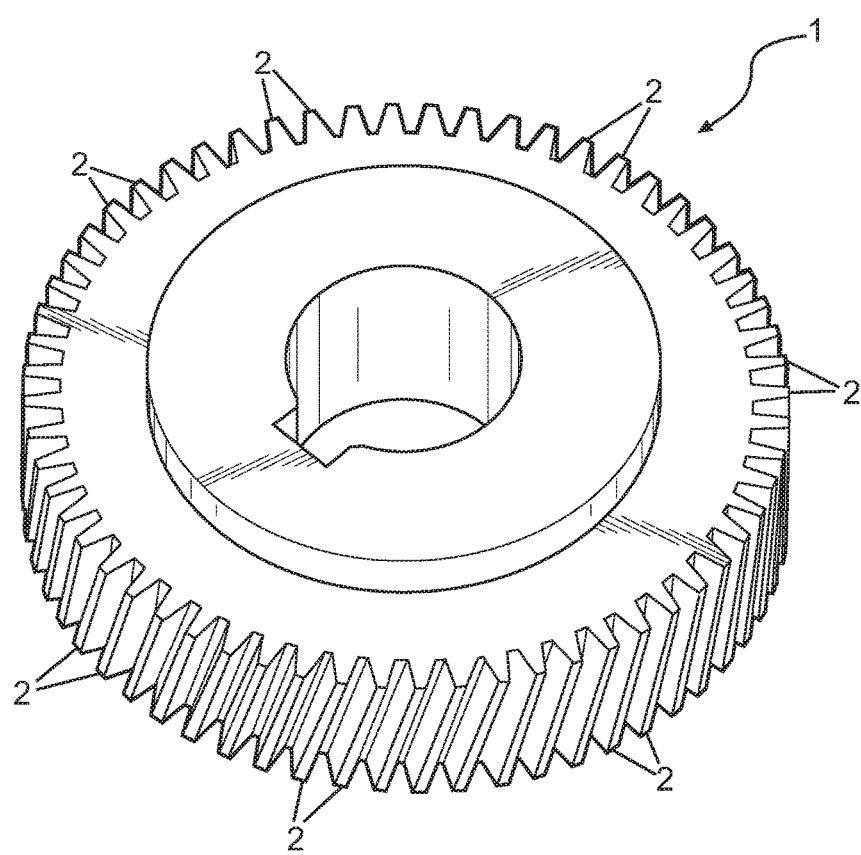
FIG. 7 is a perspective view of the gear device according to one embodiment of the invention.

One embodiment of the invention will be described with reference to the drawings. FIG. 1 is a plan view of a tooth surface having an engagement area in which gears mesh with each other, and indicates the contact length ratio which will be described later. FIG. 7 illustrates a gear device 1 having a plurality of teeth 2, which according to this embodiment transmits power through meshing engagement of helical gears. As shown in FIG. 1, in an effective engagement area of the tooth surface, a diagonal line 11 on a plane of action 10 has a diagonal length L1, and a tooth contact face 12 has a contact length L2.

The effective engagement area of the tooth surface is an area of the tooth surface other than relief portions called end reliefs provided in the direction of the tooth trace. The end reliefs are relief portions for preventing partial or non-uniform contact caused by mounting errors or misalignment of gears. The contact length L2 of the tooth contact face 12 is a length of a line segment (a portion between a start point ST and an end point EN) along which the tooth contact face 12 intersects with the diagonal line 11. The above-mentioned contact length ratio represents a value (L2/L1) obtained by dividing the contact length L2 of the tooth contact face 12 by the diagonal length L1 of the plane of action 10.

Figure 2:
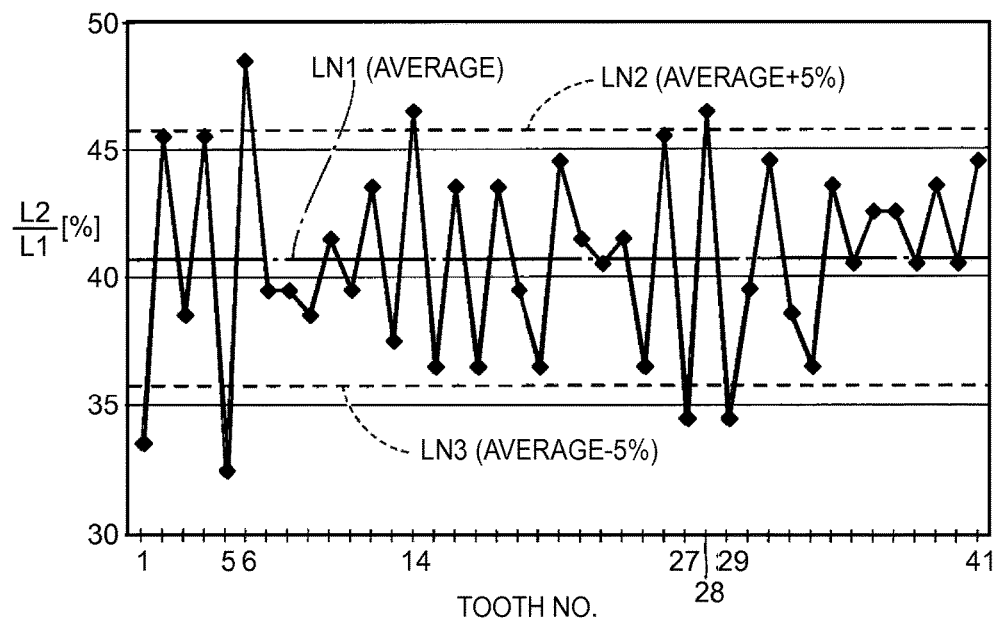
FIG. 2 is a view showing the contact length ratio of each tooth of a gear provided in a gear device according to one embodiment of the invention.

FIG. 2 shows the contact length ratio (L2/L1) of each of the teeth (No. 1 through No. 41) of one gear included in the gear device of this embodiment. The gear of the gear device according to this embodiment has tooth surfaces that are shaped such that, where teeth of the mating gears contact with each other at a minute load (torque applied to one of the gears having the smaller number of teeth is, for example, 5 Nm), the contact length ratios of three or more teeth are outside (or beyond) a given range centered on an average value (line LN1) of the contact length ratios of all of the teeth. When the contact length ratios of three or more teeth are outside the given range centered on the average value (line LN1), an influence due to eccentricity produced upon mounting of the gears is removed (where the gears are eccentrically mounted, the influence occurs to two teeth).

The above-mentioned given range is a range of variation in the contact length ratio due to machining accuracy. In this embodiment, the upper limit of the range is set to "average+ 5%" (namely, average×1.05), and the lower limit is set to "average−5%" (namely, average×0.95). The values of "average±5%" can be clearly distinguished from manufacturing variations that inevitably occur when no variation is intended. In FIG. 2, the upper limit of the given range (within "average±5%") is indicated by line LN2, and the lower limit is indicated by line LN3. In this embodiment, a total of seven teeth, i.e., tooth No. 1, No. 5, No. 6, No. 14, No. 27, No. 28 and No. 29, have tooth surfaces shaped such that the contact length ratio of each of these teeth is outside the given range (of "average±5%") centered on the average value (line LN1). Note that, as long as at least three teeth have such a tooth surface shape, the arrangement of these teeth is not limited to any particular arrangement. This configuration may be applied only to the drive gear, or only to the driven gear, or both of the drive gear and the driven gear.

Figure 3:
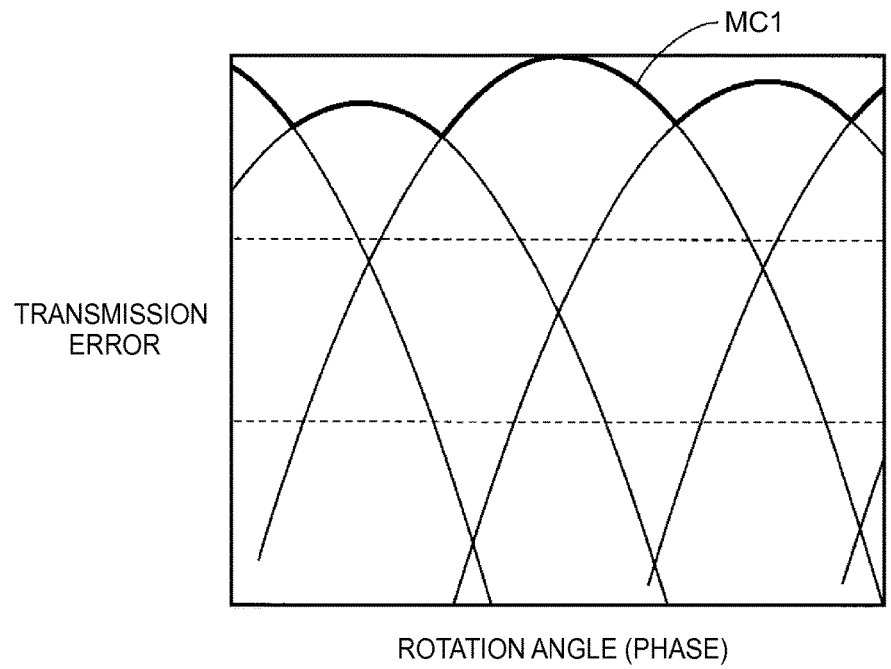
FIG. 3 is a view showing a motion curve of a gear used in the gear device of the embodiment.

FIG. 3 shows a motion curve MC of the gear used in the gear device of this embodiment. The motion curve indicates the relationship between the rotation angle of the gear and transmission error. The transmission error, which is represented as an error in the rotation angle, indicates rotation variations that occur to the other gear when one of the gears that rotate while meshing with each other is rotated at a constant speed. The transmission error is represented by the maximum angular amount (μrad) of advancement or retardation of the other gear.

There is a correlation between the transmission error and vibration noise of the gear. Generally, the vibration noise increases as the transmission error increases. In addition, the vibration noise caused by the transmission error tends to increase as the motion curve has a more cyclic or regular pattern. In this embodiment, the tooth surfaces of the gear teeth are shaped such that the contact length ratios of three or more teeth are outside the given range centered on the average value of the contact length ratios of all of the teeth; therefore, the motion curve MC1 is less likely or unlikely to have a cyclic or regular pattern. The same effect is obtained in any of the case where the above concept is applied only to the drive gear, the case where the same concept is applied only to the driven gear, and the case where the concept is applied to both of the drive gear and the driven gear.

Figure 4:
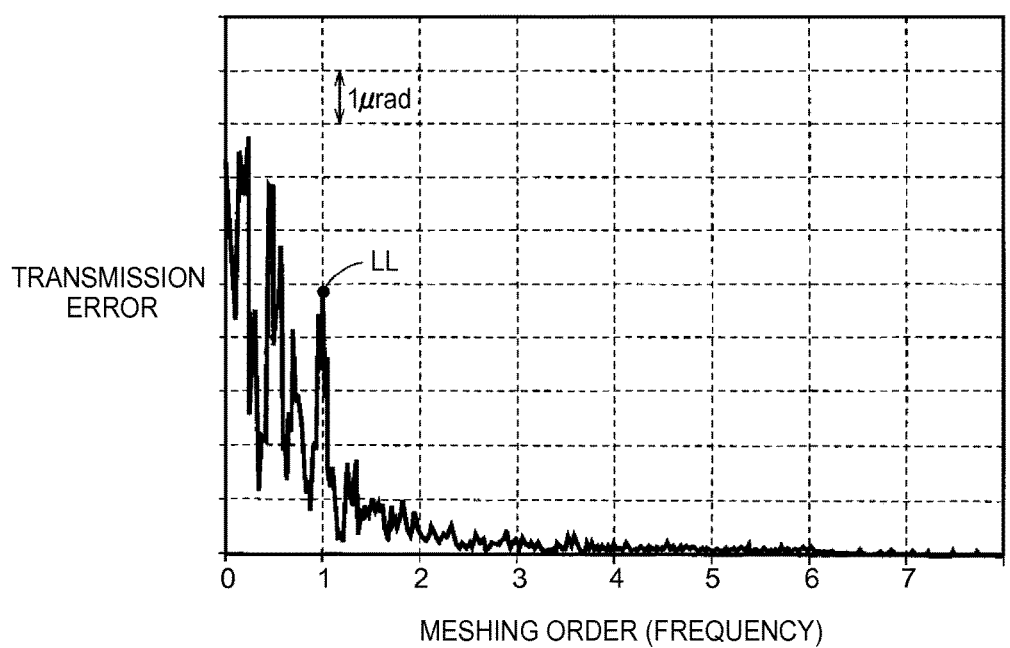
FIG. 4 is a view showing the relationship between the meshing order of the gear used in the gear device of the embodiment, and transmission error.

FIG. 4 shows the relationship between the meshing order of the gears used in the gear device of this embodiment, and the transmission error. Frequencies that are a tooth-number multiple of the rotation frequency of the gear and its integral multiples are called "meshing order of the gear". Generally, vibratory force of the gear is generated at these frequencies, and is perceived as sound or vibration, due to resonance, or the like, of a gear box or components joined to the box. In this embodiment, the motion curve MC1 (FIG. 3) is less likely or unlikely to have a cyclic or regular pattern; therefore, vibration noise caused by the transmission error is reduced as compared with a conventional gear device. This point will be described below based on comparison with a comparative example.

Figure 5:
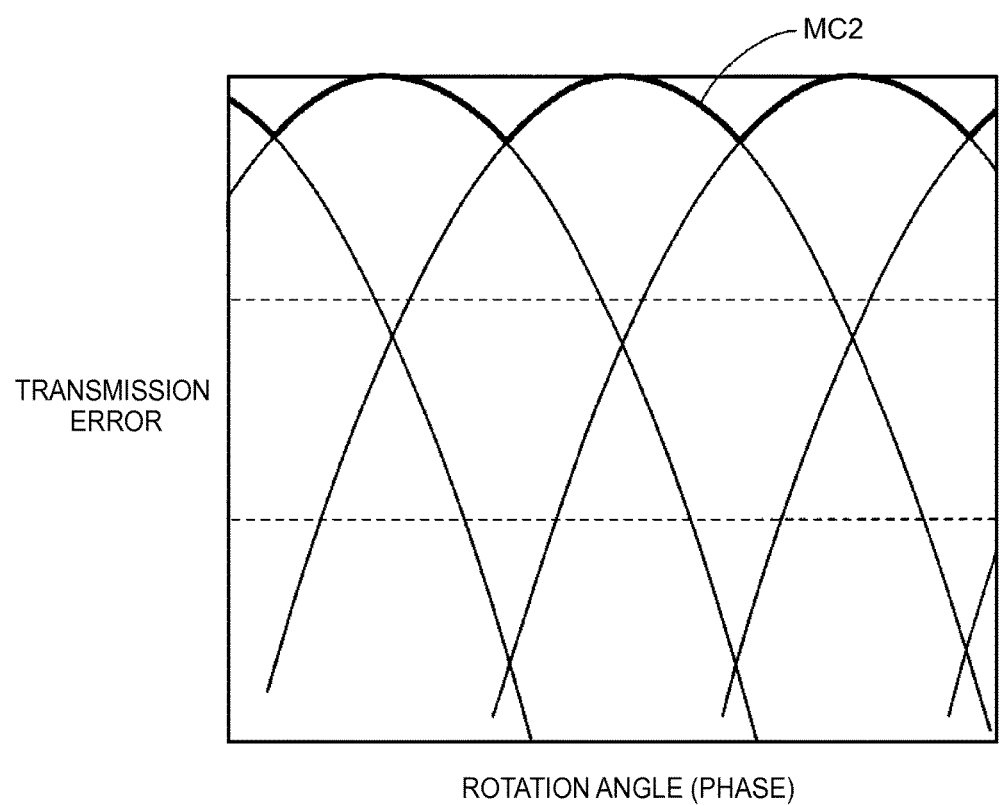
FIG. 5 is a view showing a motion curve of a gear used in a gear device of a comparative example.

FIG. 5 shows a motion curve MC2 of a gear used in a gear device of the comparative example. In the gear device of the comparative example, all of the teeth of one gear have a constant or uniform contact length ratio. Namely, the gear of the gear device of the comparative example has tooth surfaces that are not shaped such that the contact length ratios of three or more teeth are outside a given range centered on an average value of the contact length ratios of all of the teeth.

Figure 6:
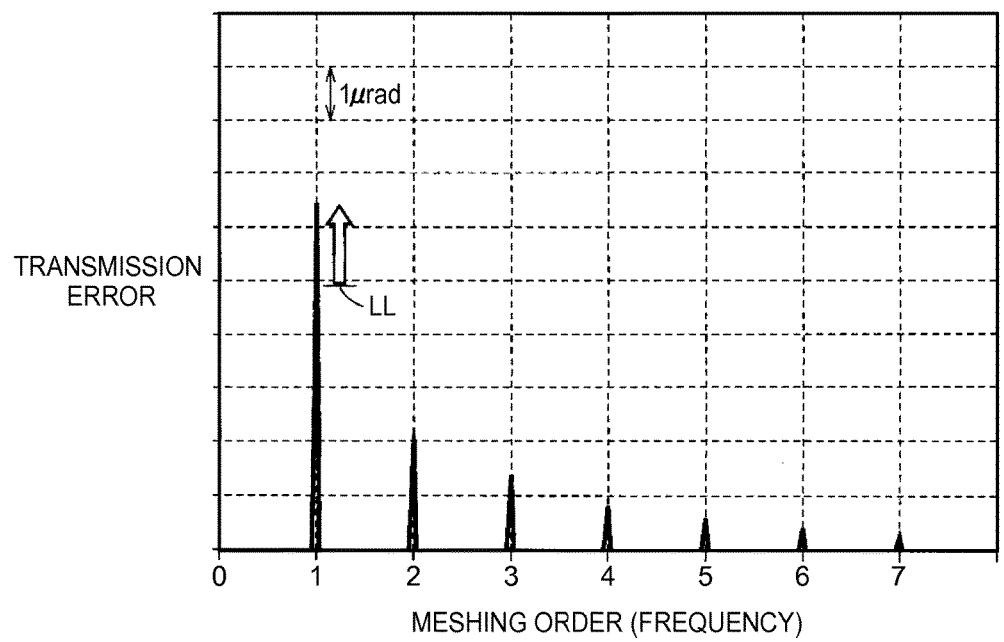
FIG. 6 is a view showing the relationship between the meshing order of the gear used in the gear device of the comparative example, and transmission error.

FIG. 6 shows the relationship between the meshing order of the gear used in the gear device of the comparative example, and transmission error. In the comparative example, the motion curve MC2 (FIG. 5) has a cyclic or regular pattern. In FIG. 6, line LL indicates a value of the transmission error obtained at the first order of meshing in this embodiment shown in FIG. 4. Namely, as is apparent from comparison between the transmission errors at the first order of meshing, the transmission error is larger in the comparative example than that in this embodiment. It will be thus understood that, with the arrangement of this embodiment, the vibration noise caused by the transmission error can be reduced as compared with the conventional gear device.

While one embodiment of the invention has been described above, the content disclosed herein is exemplary and not restrictive in all aspects. The technical scope of the invention is defined or indicated by the appended claims, and is intended to include all changes within the meaning and ranges of the claims and equivalents thereof.

What is claimed is:

1. A gear device comprising:
a gear including a plurality of teeth, the plurality of teeth having tooth surfaces, the tooth surfaces being shaped such that contact length ratios of three or more of the teeth are outside a predetermined range centered on an average value of the contact length ratios of all of the teeth, the contact length ratio being obtained by dividing a contact length of a tooth contact face by a diagonal length of a plane of action.

2. The gear device according to claim 1, wherein
the predetermined range is between a value obtained by adding 5% to the average value and a value obtained by subtracting 5% from the average value.

3. The gear device according to claim 1, wherein:
the number of teeth of the gear is 41; and
where a tooth located at a given position of the gear is a 1st tooth, the teeth whose tooth surfaces are shaped such that the contact length ratio is outside the predetermined range centered on the average value comprise the 1st tooth, a 5th tooth, a 6th tooth, a 14th tooth, a 27th tooth, a 28th tooth, and a 29th tooth.

* * * * *